United States Patent

[11] 3,611,835

| [72] | Inventor | August H. Borman<br>Livonia, Mich. |
|---|---|---|
| [21] | Appl. No. | 880,647 |
| [22] | Filed | Nov. 28, 1969 |
| [45] | Patented | Oct. 12, 1971 |
| [73] | Assignee | General Motors Corporation<br>Detroit, Mich. |

[54] TRANSMISSION
4 Claims, 1 Drawing Fig.

[52] U.S. Cl. ........................................ 74/759,
74/688, 74/765
[51] Int. Cl. ........................................ F16h 57/10,
F16h 47/08
[50] Field of Search ............................ 74/759,
688, 765

[56] References Cited
UNITED STATES PATENTS

| 2,546,378 | 3/1951 | Winther | 74/759 |
|---|---|---|---|
| 2,795,972 | 6/1957 | Cavallier | 74/759 |
| 2,892,365 | 6/1959 | Winther | 74/759 |
| 3,063,308 | 11/1962 | Wayman | 74/730 X |
| 3,159,051 | 12/1964 | Herndon et al. | 74/688 X |
| 3,455,185 | 7/1969 | Ohno et al. | 74/688 |

*Primary Examiner*—Arthur T. McKeon
*Attorneys*—W. E. Finken, A. M. Heiter and R. L. Phillips

ABSTRACT: A vehicle transmission having a hydrodynamic torque converter and two planetary gear sets combined with three clutches, a one-way clutch, three brakes and two one-way brakes to provide four forward drives including an overdrive and also to provide a reverse drive.

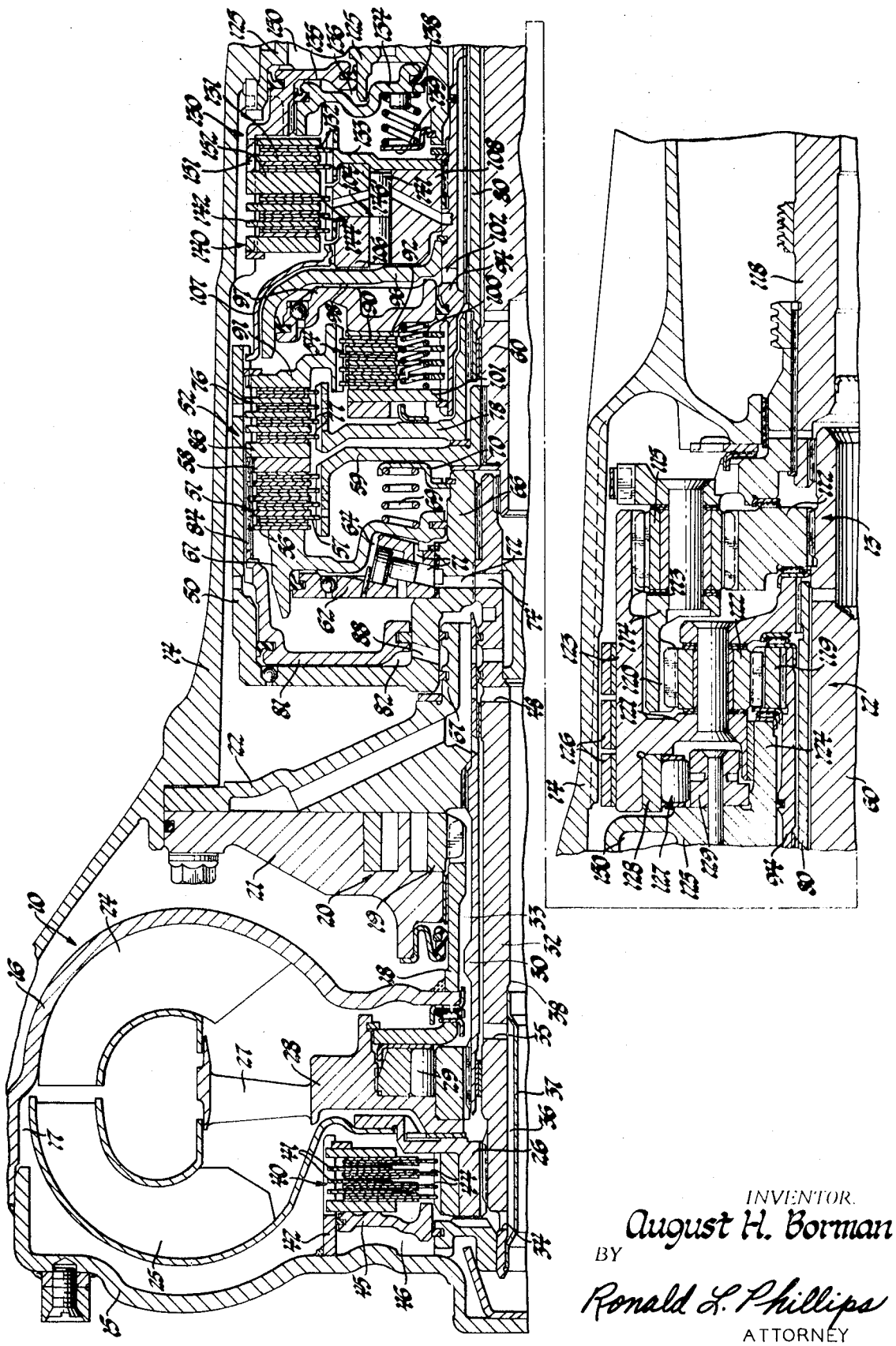
PATENTED OCT 12 1971
3,611,835
INVENTOR.
August H. Borman
BY
Ronald L. Phillips
ATTORNEY

TRANSMISSION

This invention relates to transmissions and more particularly to vehicle transmissions affording a plurality of drives including an overdrive.

The present invention is embodied in a transmission generally comprising a hydrodynamic torque converter and a pair of planetary gear sets. One of the gear sets is located at the rear of the transmission and the other gear set is located toward the front. The gear sets are combined with drive-establishing devices to provide four forward speed range drives, neutral and a reverse speed range drive and the converter has a lockup clutch which may be engaged at a predetermined output speed in the forward drives. For the first and lowest forward speed range drive, a clutch is engaged to connect the converter's turbine to drive the sun gear of the rear gear set. The ring gear of the rear gear set is held against backward rotation by a one-way brake and the carrier is connected to drive the output shaft in the same direction as the sun gear and at a reduced speed. For engine braking in this drive, a brake is engaged to hold the ring gear against rotation in the forward direction. For the second forward speed range drive, the previously engaged clutch remains engaged to transmit drive to the sun gear of the rear gear set and a brake is engaged so that another one-way brake is effective to hold the sun gear of the front sun gear set against backward rotation. The ring gear and carrier of the rear gear set are connected to the carrier and ring gear of the front gear set so that the second forward speed range drive is provided by compound action of the two gear sets driving the transmission output shaft in the forward direction. Engine braking in the second forward speed range drive is made available by engaging a brake to hold the sun gear of the front gear set against forward rotation. The third forward speed range drive is provided by retaining the clutched turbine drive to the sun gear of the rear gear set and engaging another clutch which connects the turbine to also drive the carrier of the front gear set. This locks up the gearing so that there is provided a 1:1 speed-ratio drive between the turbine and the transmission output shaft with engine braking made available by this drive arrangement. The fourth and highest speed range drive is an overdrive and is provided by maintaining the clutched turbine drive to the carrier of the front gear set, disengaging the turbine drive to the sun gear of the rear gear set and engaging a brake to hold the sun gear of the front gear set against rotation in the forward direction. For the shift from third to the fourth forward speed range drive, there is provided a one-way clutch between the turbine and the sun gear of the front gear set preventing run away of the sun gear of the front gear set in the forward direction and thus preventing power interruption during the shift. In the fourth forward speed range drive with the turbine drive to the carrier of the front gear set and with the sun gear of this gear set held against forward rotation, the ring gear of this gear set and connected transmission output shaft are driven in the forward direction at a speed greater than that of the turbine drive. Engine braking is made available in overdrive since the sun gear of the front gear set is prevented from rotating in the reverse direction.

Thus in the transmission according to the present invention, there is no need to time disengagement of one drive establishing device with engagement of another drive establishing device to prevent interruption of power transmittal during shifting between the forward drives. The reverse speed range drive is provided by engaging the brake that holds the carrier of the front gear set and engaging a clutch that connects the turbine to drive the sun gear of this gear set. Engine braking is made available in reverse drive since reverse rotation of the carrier is prevented.

An object of the present invention is to provide a new and improved transmission.

Another object is to provide a transmission having two simple planetary gear sets with two pairs of unlike members connected and a pair of like members of which one may be selectively input driven and the other may be selectively input driven or held to provide three forward speed range drives and a reverse speed range drive and with another member of one of these gear sets also being selectively input driven to provide an additional forward speed range drive which is an overdrive with power interruption prevented on the shift to overdrive.

Another object is to provide a transmission having a hydrodynamic torque converter and two planetary gear sets combined with three clutches, a one-way clutch, three brakes and two one-way brakes to provide four forward drives including an overdrive and also provide a reverse drive with no power interruption on shifting between the forward drives and also engine braking available in each drive.

Another object is to provide a transmission having a hydrodynamic torque converter and two planetary gear sets combined with three clutches, a one-way clutch, three brakes and two one-way brakes and with two pairs of unlike members of the two gear sets connected, and three members of two gear sets each having selective input drives to provide four forward drives and reverse drive with no power interruption on shifting between the forward drives and also engine braking available in each drive.

These and other objects of the invention will be more apparent from the following description and drawing in which:

A longitudinal sectional view of the preferred embodiment of the transmission according to the present invention is shown.

In the drawing there is shown a vehicle transmission generally comprising a hydrodynamic torque converter 10 and two planetary gear sets 12 and 13 all housed in a transmission housing 14. The transmission is operable to provide four forward speed range drives, neutral and reverse drive. The four forward speed range drives include first gear reduction drive, second gear reduction drive, direct drive and overdrive.

Describing now the structural details, an engine driven housing 15 and connected impeller cover 16 rotate at engine speed and enclose a fluid chamber 17. Cover 16 drives through a sleeve 18, a pump drive gear 19 of a pump 20, the sleeve being welded to the cover and splined to the gear as shown. Pump 20 is located in a pump housing 21 which is bolted to a front bulkhead 22, the bulkhead being secured by these same bolts to transmission housing 14. Torque converter 10 includes a series of impeller or pump vanes 24 carried by cover 16, turbine vanes 25 carried by a hub 26 and reaction or stator vanes 27 which are supported by a reaction hub 28 and disposed between the inner ends of the turbine and impeller vanes. Reaction vanes 27 and hub 28 are permitted free rotation in the same direction as the impeller and turbine vanes, which direction is the forward direction, by a one-way brake 29 disposed between hub 28 and a ground sleeve 30 splined to bulkhead 22. One-way brake 29 prevents reverse rotation of reaction vanes 27 under the influence of the circulating fluid in the converter. Turbine hub 26 is splined to the front end of a turbine shaft 32 which transmits the turbine drive to the gear sets 12 and 13. Fluid is delivered to the converter from the pump 20 via a transmission control system pressure regulator valve (not shown) through a passage 33. Fluid is retained from the converter to the sump of pump 20 via ports 34 and 35 in turbine shaft 32 and a passage 36 which connects these ports, this passage being formed by a sleeve 37 fitted in a bore 38 of turbine shaft 32.

A lockup clutch indicated generally at 40 is for connecting the transmission input to turbine shaft 32 through a mechanical path instead of through the hydraulic path provided by converter 10 which is locked up by engagement of this clutch. Lockup clutch 40 comprises drive plates 41 which are connected by splines to a clutch housing 42 that is secured to housing 15. Plates 41 are adapted to engage driven plates 44 that are splined to turbine hub 26 and are thus connected to turbine shaft 32. A piston 45 forms with housing 42 a chamber 46 that is adapted to receive fluid under pressure to engage the lockup clutch. Fluid pressure may be admitted to chamber 46 through a port 48 and the bore 38 in turbine shaft 32.

Turbine shaft 32 is splined at its rear end to a clutch drum 50 in which is located three clutches indicated generally at 51, 52 and 54. Clutch 51 comprises drive plates 56 which are drivingly connected by splines to drum 50 and are adapted to engage driven plates 57 with reaction being taken by a plate 58 secured to drum 50. Driven plates 57 are drivingly connected by splines to a clutch hub 59 that is splined to the front end of a shaft 60. A piston 61 forms with an annular plate 62 a chamber 64 that is adapted to receive fluid pressure to engage clutch 51. The plate 62 is mounted on hub 66 of the drum 50 which is supported at its front end for rotation on boss 67 of bulkhead 22. A release spring 69 seated upon a spring seat 70 carried by hub 66 biases piston 61 towards its clutch release position. Fluid pressure for engaging clutch 51 may be admitted to chamber 64 through passages 71, 72 and 74 in plate 62, hub 66 and turbine shaft 32, respectively.

The clutch 52 comprises drive plates 76 which are drivingly connected by splines to the drum 50. Drive plates 76 are adapted to engage driven plates 77 which are drivingly connected by splines to a clutch hub 78 that is splined to the front end of a sleeve shaft 80 surrounding shaft 60. A piston 81 forms with drum 50 to a chamber 82 that is adapted to receive fluid under pressure to engage clutch 52, the force from piston 81 to the clutch plates 76 and 77 being delivered via a pin 84 to pressure plate 86 of the clutch. Fluid pressure for engaging clutch 52 may be admitted to chamber 82 through a passage 88 in drum 50.

The clutch 54 comprises drive plates 90 which are drivingly connected by splines to a collar 91 that is splined to drum 50. Drive plates 90 are adapted to engage driven plates 92 which are drivingly connected by splines to a sleeve shaft 94 surrounding shaft 80. A cylinder 96 is secured to shaft 94 and a piston 97 forms with shaft 94 and a cylinder 96 a chamber 98 that is adapted to receive fluid under pressure to engage clutch 54. A spring 100 seated upon reaction plate 101 of this clutch biases the piston 97 towards its clutch release position, the reaction plate being mounted on shaft 94. Fluid pressure may be admitted to chamber 98 to engage clutch 54 through a port 102 in shaft 94.

In addition to the selective connection provided by clutch 54 between drum 50 and shaft 94, there is provided a one-way clutch 104 whose outer race 106 is connected by a bell-shaped member 107 to drum 50. The inner race 108 of one-way clutch 104 is splined to shaft 94. The one-way clutch 104 may be of any suitable conventional type such as the roller type shown and operates to permit free backward rotation of the shaft 94 relative to drum 50 and prevent forward rotation relative thereto.

The gear set 13 is a simple helical planetary gear set and comprises an annular sun gear 112, a ring gear 113 and a planet carrier 114 having a planet pinion 115 in mesh with sun gear 112 and ring gear 113. The sun gear 112 is splined to the rear end of shaft 60. The carrier 114 is splined to a shaft 118 which is supported for rotation by the transmission housing 14 as shown and serves as the transmission's output.

The gear set 12 located forward of gear set 13 is also a simple helical planetary gear set and comprises an annular sun gear 119 splined to the rear end of shaft 94, a ring gear 120 formed integral with carrier 114 of the other gear set and a planet carrier 121 having a planet pinion 122 in mesh with sun gear 119 and ring gear 120. Carrier 121 is splined to the rear end of shaft 80 and is formed integral with both a drum 123 and the ring gear 113 of the other gear set. Carrier 121 is supported for rotation on a boss 124 projecting from the rear side of a rear bulkhead 125 which is splined to the transmission housing. A bank brake 126 grounded to the transmission housing 14 and operated by any suitable fluid pressure operated servomotor is adapted to engage drum 123. In addition to this selective holding of drum 123, there is provided a one-way brake 127 whose outer race 128 is secured to the drum 123 and whose inner race 129 is secured to rear bulkhead 125. The one-way brake 127 may be of any suitable conventional type such as the roller type shown and operates to prevent reverse rotation of drum 123 and thus carrier 121 and ring gear 113 and permit free forward rotation thereof.

A brake indicated generally at 130 is for holding the sun gear 119 of the front gear set 12 and comprises plates 131 which are connected by splines to the transmission housing. Plates 131 are adapted to engage plates 132 which are connected by splines to a hub 133 that is in turn connected by splines to the shaft 94 and thus to sun gear 119. A piston 134 forms with the front side of bulkhead 125 and another piston 135 which is described in more detail later a chamber 136. Chamber 136 is adapted to receive fluid under pressure through a passage, not shown, in the bulkhead 125 to engage brake 130. A spring 138 seated upon a spring seat 139 carried on bulkhead 125 biases piston 134 towards its brake release position.

The sun gear 119 of the front gear set 12 may be selectively prevented from only reverse rotation by a brake indicated generally at 140 and a one-way brake 141 in series therewith. The brake 140 comprises plates 142 which are connected by splines to the transmission housing 14. Plates 142 are adapted to engage plates 144 which are connected by splines to the outer race 146 of the one-way brake 141. The piston 135 forms with the front side of bulkhead 125 a chamber 150 that is adapted to receive fluid under pressure via a passage, not shown, in the bulkhead 125. The piston 135 has an axial extension 151 which extends past the plates of brake 130 to act on pressure plate 152 of brake 140 to engage the latter. The inner race 108 of one-way clutch 104 also serves as the inner race of the one-way brake 141. The one-way brake 141 which may be of any suitable conventional type such as the roller type shown operates when brake 140 is engaged to permit free forward rotation of sun gear 119 and prevent reverse rotation thereof.

The drive-establishing clutches and brakes may be actuated by any suitable hydraulic control system and in a certain sequence. The following description illustrates the operation available.

The above-described transmission arrangement affords at least four forward speed range drives, neutral and a reverse speed range drive. These drives may also be called the transmission's gear ratios.

For neutral, all of the clutches and brakes are released and no power from turbine shaft 32 which serves as the input to the gearing can be transmitted to output shaft 118.

The first and lowest forward speed range drive is established by engaging clutch 51. Power from the forwardly rotating turbine shaft 32 is delivered through the engaged clutch 51 and then shaft 60 to drive sun gear 112 in gear set 13 forwardly. In gear set 13, the torque input to pinion 115 from sun gear 112 tries to rotate ring gear 113 backwardly but such reverse rotation is prevented by one-way brake 127. Planet pinion 115 therefore walks forwardly around the interior of ring gear 113 and drives carrier 114 and thus output shaft 118 at a reduced speed.

In this first forward speed range drive, drive is at the reduction ratio thus provided by gear set 13. Due to the action of one-way brake 127, power cannot be transmitted from the output shaft 118 to the converter's turbine 25 for engine braking and thus the output shaft can overrun when the vehicle is coasting. In the first forward speed range drive, the brake 126 may be engaged as an overrun brake to prevent forward rotation of ring gear 113 to provide for engine braking.

The second and next higher forward speed range drive is established by retaining engagement of clutch 51, releasing brake 126 if it is engaged and engaging brake 140. Engaged brake 140 and the one-way brake 141 in series therewith prevent reverse rotation of sun gear 119 in gear set 12. Power remains applied to sun gear 112, but now with the other sun gear 119 prevented from rotating backwardly as it did in the first forward speed range drive by operation of one-way brake 141, the two gear sets 12 and 13 by compound action drive the connected ring gear 120 and carrier 114 and thus output shaft 118 forwardly at a reduced speed in a speed range higher than that obtainable in the first forward speed range drive. One-way brake 141 permits free forward rotation of sun gear 119 and thus power cannot be transmitted from the output shaft to the turbine for engine braking. In the second forward speed range drive, the brake 130 may be engaged as an overrun brake to prevent forward rotation of sun gear 119 to provide for engine braking.

The third and next higher forward speed range drive is established by maintaining engagement of clutch 51, releasing brake 130 if it is engaged, and engaging clutch 52. The brake 140 may remain engaged since one-way brake 141 permits the forward rotation of sun gear 119 in gear set 12 effected by engagement of clutch 52. Since the sun gear 112 of gear set 13 and the carrier 121 of gear set 12 are driven at the same speed and because of the connections of these two gear sets, the gearing is locked up to provide a 1:1 speed ratio or direct drive to drive output shaft 118 in the forward direction. With the gearing locked up, engine braking is made available.

The fourth and highest forward speed range drive is established by maintaining engagement of clutch 52, releasing clutch 51 and engaging brake 130. As clutch 51 is released, the drive through engaged clutch 52 tries to increase the speed of sun gear 119 in the forward direction. On this occurrence, the one-way clutch 104 engages so that the sun gear 119 is prevented from speeding up in the forward direction relative to turbine shaft 32. The reaction for this prevention is transmitted through one-way clutch 104 back through engaged clutch 52 to carrier 121 of gear set 12. This makes it possible to immediately release clutch 51 for an upshift to the fourth forward speed range drive so that brake 130 can be engaged after clutch 51 has been completely released, the engagement of brake 130 then preventing forward rotation of sun gear 119. Without one-way clutch 104, it would be necessary to time engagement of brake 130 to the release of clutch 51 to avoid power interruption. With the fourth forward speed range drive established, the turbine drive to carrier 121 causes the pinion 122 to walk in the forward direction around the braked sun gear 119 resulting in the ring gear 120 and connected output shaft 118 being driven in the forward direction at a speed higher than the turbine driven carrier 121. With the brake 130 also preventing reverse rotation of sun gear 119, engine braking is made available in this overdrive.

The above sequential operation demonstrates how this transmission arrangement with overdrive prevents power interruption during shifting so that there is no need to time release of one drive establishing device with engagement of another. Downshifts are effected by reversing this order of operation. The lockup clutch 40 may be engaged at a predetermined transmission output speed to increase the transmission's efficiency and this may occur in each of the forward drives.

Reverse speed range drive is obtained by engaging clutch 54 and brake 126. With carrier 121 held by brake 126, the turbine driven sun gear 119 drives pinion 122 which in turn drives ring gear 120 and connected output shaft 118 in the reverse direction with the speed reduction ratio this provided by gear set 12. Engine braking is made available since reverse rotation of carrier 121 is prevented.

The four forward drives and one reverse drive thus made available make the transmission particularly suitable for use in a passenger car with the fourth forward speed range drive, which is an overdrive, providing for economical cruising operation. Furthermore, this transmission arrangement provides a wide gear ratio selection to enable efficient meeting of the transmission requirements of the many engine-load combinations found in passenger cars.

The above-described preferred embodiment is illustrative of the invention which may be modified within the scope of the appended claims.

I claim:

1. In a transmission the combination of an input member; an output member; first and second planetary gear sets each having a sun gear, a ring gear and a carrier supporting a pinion in mesh with the sun gear and ring gear; the carrier of said first gear set, the ring gear of said second gear set and said output member all being connected; the ring gear of said first gear set connected to the carrier of said second gear set; first clutch means for selectively connecting said input member to the sun gear of said first gear set; second clutch means for selectively connecting said input member to the sun gear of said second gear set; third clutch means for selectively connecting said input member to the carrier of said second gear set; first drive-establishing means for selectively preventing rotation of the ring gear of said first gear set and the carrier of said second gear set in only one direction and, alternatively, in any direction; second drive-establishing means for selectively preventing rotation of the sun gear of said second gear set in only one direction and, alternatively, in any direction; and one-way clutch means for preventing rotation of the sun gear of said second gear set in only one direction relative to said input member when said first clutch means is disengaged while said third clutch means is engaged whereby a first forward speed range drive is provided on engagement of said first clutch means and operation of said first drive-establishing means to prevent rotation of the ring gear of said first gear set in at least one direction, a second forward speed range drive is provided on engagement of said first clutch means and operation of said second drive-establishing means to prevent rotation of the sun gear of said second gear set in at least one direction, a third forward speed range drive is provided on engagement of said first clutch means and said third clutch means, a fourth forward speed range drive is provided on engagement of said third clutch means and on operation of said second drive-establishing means to prevent rotation of the sun gear of said second gear set in at least one direction, and a reverse speed range drive is provided on engagement of said second clutch means and on operation of said first drive-establishing means to prevent rotation of the carrier of said second gear set in at least one direction and whereby there is no power interruption on shifting between said forward speed range drives.

2. The transmission set forth in claim 1 and said first drive-establishing means comprising one-way brake means for preventing rotation of the ring gear of said one gear set in only one direction and brake means for selectively preventing any rotation of the ring gear of said first gear set and the carrier of said second gear set.

3. The transmission set forth in claim 1 and said second drive-establishing means comprising brake means for selectively preventing any rotation of the sun gear of the said second gear set and additional brake means and one-way brake means in series with said additional brake means for selectively preventing rotation of the sun gear of said second gear set in only one direction.

4. The transmission set forth in claim 1 and said first drive-establishing means comprising one-way brake means for preventing rotation of the ring gear of said one gear set in only one direction and brake means for selectively preventing any rotation of the ring gear said first gear set and the carrier of said second gear set; said second drive-establishing means comprising brake means for selectively preventing any rotation of the sun gear of the said second gear set and additional brake means and one-way brake means in series with said additional brake means for selectively preventing rotation of the sun gear of said second gear set in only one direction.